United States Patent
Ishikawa et al.

(10) Patent No.: US 10,782,716 B2
(45) Date of Patent: Sep. 22, 2020

(54) SWITCHING CONTROL APPARATUS

(71) Applicant: KABUSHIKI KAISHA TOYOTA CHUO KENKYUSHO, Nagakute-shi, Aichi-ken (JP)

(72) Inventors: Keisuke Ishikawa, Nagakute (JP); Shuntaro Inoue, Nagakute (JP); Masanori Ishigaki, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 28 days.

(21) Appl. No.: 16/373,713

(22) Filed: Apr. 3, 2019

(65) Prior Publication Data
US 2019/0310671 A1    Oct. 10, 2019

(30) Foreign Application Priority Data
Apr. 4, 2018    (JP) ................. 2018-072288

(51) Int. Cl.
H02J 5/00    (2016.01)
H02J 7/02    (2016.01)
(Continued)

(52) U.S. Cl.
CPC .............. *G05F 1/10* (2013.01); *H01F 38/14* (2013.01); *H02J 5/005* (2013.01); *H02J 7/025* (2013.01); *H02J 50/12* (2016.02)

(58) Field of Classification Search
CPC ... G05F 1/10; H02J 50/12; H02J 5/005; H02J 5/00; H02J 7/025; H02J 7/02; H01F 38/14
See application file for complete search history.

(56) References Cited

U.S. PATENT DOCUMENTS

| 5,633,577 A | 5/1997 | Matsumae et al. |
| 2011/0198933 A1 | 8/2011 | Ishigaki et al. |
| 2014/0368056 A1 | 12/2014 | Hosotani |

FOREIGN PATENT DOCUMENTS

| JP | H08-65904 A | 3/1996 |
| JP | 2010-136519 A | 6/2010 |

(Continued)

OTHER PUBLICATIONS

Dec. 3, 2019 Office Action issued in Japanese Patent Application No. 2018-072288.

(Continued)

*Primary Examiner* — Robert L Deberadinis
(74) *Attorney, Agent, or Firm* — Oliff PLC

(57) ABSTRACT

The present disclosure intends to simplify the wiring structure of a switching circuit included in a power conversion apparatus. A feedback signal acquisitor acquires a power supply feedback signal corresponding to electric power transmitted from a power supply switching unit to a load switching unit, via coupling conductive elements, from the power supply switching unit. Alternatively, the feedback signal acquisitor acquires a load feedback signal corresponding to the electric power, via coupling conductive elements, from the load switching unit. A command signal generator generates a power supply switching command signal and a load switching command signal. A command signal transmitter transmits the power supply switching command signal to the power supply switching unit via the coupling conductive elements, and transmits the load switching command signal to the load switching unit via the coupling conductive elements.

6 Claims, 14 Drawing Sheets

(51) Int. Cl.
*G05F 1/10* (2006.01)
*H02J 50/12* (2016.01)
*H01F 38/14* (2006.01)

(56) References Cited

FOREIGN PATENT DOCUMENTS

| JP | 2010-284065 A | 12/2010 |
| JP | 2011-193713 A | 9/2011 |
| JP | 2017-093089 A | 5/2017 |
| WO | 2013/133028 A1 | 9/2013 |
| WO | 2017/115625 A1 | 7/2017 |

OTHER PUBLICATIONS

Apr. 7, 2020 Japanese Office Action issued in Japanese Patent Application No. 2018-072288.
Jun. 23, 2020 Office Action issued in Japanese Patent Application No. 2018-072288.

SWITCHING CONTROL APPARATUS

CROSS REFERENCE TO RELATED APPLICATION

This application claims priority to Japanese Patent Application No. 2018-072288 filed on Apr. 4, 2018, which is incorporated herein by reference in its entirety including the specification, claims, drawings, and abstract.

TECHNICAL FIELD

The present disclosure relates to a switching control apparatus, and also relates to a technique for controlling a plurality of switching circuits.

BACKGROUND

Electrically driven vehicles, such as hybrid cars and electric cars, are widely used. One technology enthusiastically researched and developed in recent years is Vehicle-to-Grid (V2G), which supplies electric power from batteries mounted on an electrically driven vehicle to a power system such as a commercial power supply system and also supplies electric power from the power system to the batteries. According to the V2G technology, a power conversion apparatus capable of adjusting electric power is used to supply adjusted power from batteries to a power system, or to output adjusted power from the power system to the batteries. Similarly, research and development has recently been carried out on Vehicle-to-Home (V2H), which is a technology for supplying electric power from batteries mounted on an electrically driven vehicle to an electric device used in an ordinary home, an office, or the like. Even in the V2H technology, a power conversion apparatus is provided in a power path between the batteries and the electric device.

In general, the power conversion apparatus has a plurality of switching elements. A control apparatus controls the power conversion apparatus by on/off controlling each switching element, thereby causing the power conversion apparatus to adjust electric power to be transmitted.

CITATION LIST

Patent Literature

[Patent Document 1] WO 2013-133028 A

SUMMARY

The wiring connected to switching elements included in the power conversion apparatus includes not only wiring for supplying electric power but also wiring for controlling respective switching elements. Accordingly, the wiring extending to the power conversion apparatus is complicated in structure. The above-mentioned Patent Document 1 discloses a power transmission system capable of solving the above-mentioned problem. In this system, electric power is transmitted from a power transmission apparatus to a power reception apparatus due to resonance caused by a resonance circuit of the power transmission apparatus and a resonance circuit of the power reception apparatus. Since using a conducting wire for power transmission to connect the power transmission apparatus and the power reception apparatus is unnecessary, the structure can be simplified. However, there is no concrete description of a wiring structure or the like for controlling each switching element in the power transmission apparatus and the power reception apparatus.

The present disclosure intends to simplify the wiring structure of a switching circuit included in a power conversion apparatus.

The present disclosure provides a switching control apparatus for controlling a first switching unit, and a second switching unit that contactlessly acquires electric power from the first switching unit, including a first contactless coupling element configured to contactlessly couple with a coupling element included in the first switching unit, a second contactless coupling element configured to contactlessly couple with a coupling element included in the second switching unit, a feedback signal acquisitor configured to acquire a feedback signal corresponding to the electric power transmitted from the first switching unit to the second switching unit, from the first switching unit via the first contactless coupling element, or from the second switching unit via the second contactless coupling element, a command signal generator configured to generate a first switching command signal for the first switching unit and a second switching command signal for the second switching unit based on the feedback signal, and a command signal transmitter configured to transmit the first switching command signal to the first switching unit via the first contactless coupling element and transmit the second switching command signal to the second switching unit via the second contactless coupling element, wherein the first switching unit and the second switching unit perform switching at timings corresponding to the first switching command signal and the second switching command signal, respectively.

Further, the present disclosure provides a switching control apparatus for controlling a first switching unit and a second switching unit that contactlessly acquires electric power from the first switching unit, including a contactless coupling element configured to contactlessly couple with a coupling element included in the second switching unit, a feedback signal acquisitor configured to acquire a feedback signal corresponding to the electric power transmitted from the first switching unit to the second switching unit, from the first switching unit, or from the second switching unit via the contactless coupling element, a command signal generator configured to generate a first switching command signal for the first switching unit and a second switching command signal for the second switching unit based on the feedback signal, and a command signal transmitter configured to give the first switching command signal to the first switching unit and transmit the second switching command signal to the second switching unit via the contactless coupling element, wherein the first switching unit and the second switching unit perform switching at timings corresponding to the first switching command signal and the second switching command signal, respectively.

Further, the present disclosure provides a switching control apparatus for controlling a first switching unit and a second switching unit that contactlessly acquires electric power from the first switching unit, including a contactless coupling element configured to contactlessly couple with a coupling element included in the first switching unit, a feedback signal acquisitor configured to acquire a feedback signal corresponding to the electric power transmitted from the first switching unit to the second switching unit, from the first switching unit via the contactless coupling element, or from the second switching unit, a command signal generator configured to generate a first switching command signal for the first switching unit and a second switching command signal for the second switching unit based on the feedback signal, and a command signal transmitter configured to transmit the first switching command signal to the first switching unit via the contactless coupling element and give the second switching command signal to the second switching unit, wherein the first switching unit and the second switching unit perform switching at timings corresponding to the first switching command signal and the second switching command signal, respectively.

In an embodiment, there is provided a phase adjuster including the command signal generator and the command signal transmitter and configured to adjust a difference between switching phase of the first switching unit and switching phase of the second switching unit based on the feedback signal.

According to the present disclosure, it is possible to simplify the wiring structure of the switching circuit included in the power conversion apparatus.

BRIEF DESCRIPTION OF DRAWINGS

Embodiment(s) of the present disclosure will be described by reference to the following figures, wherein.

DESCRIPTION OF EMBODIMENTS

Figure 1:
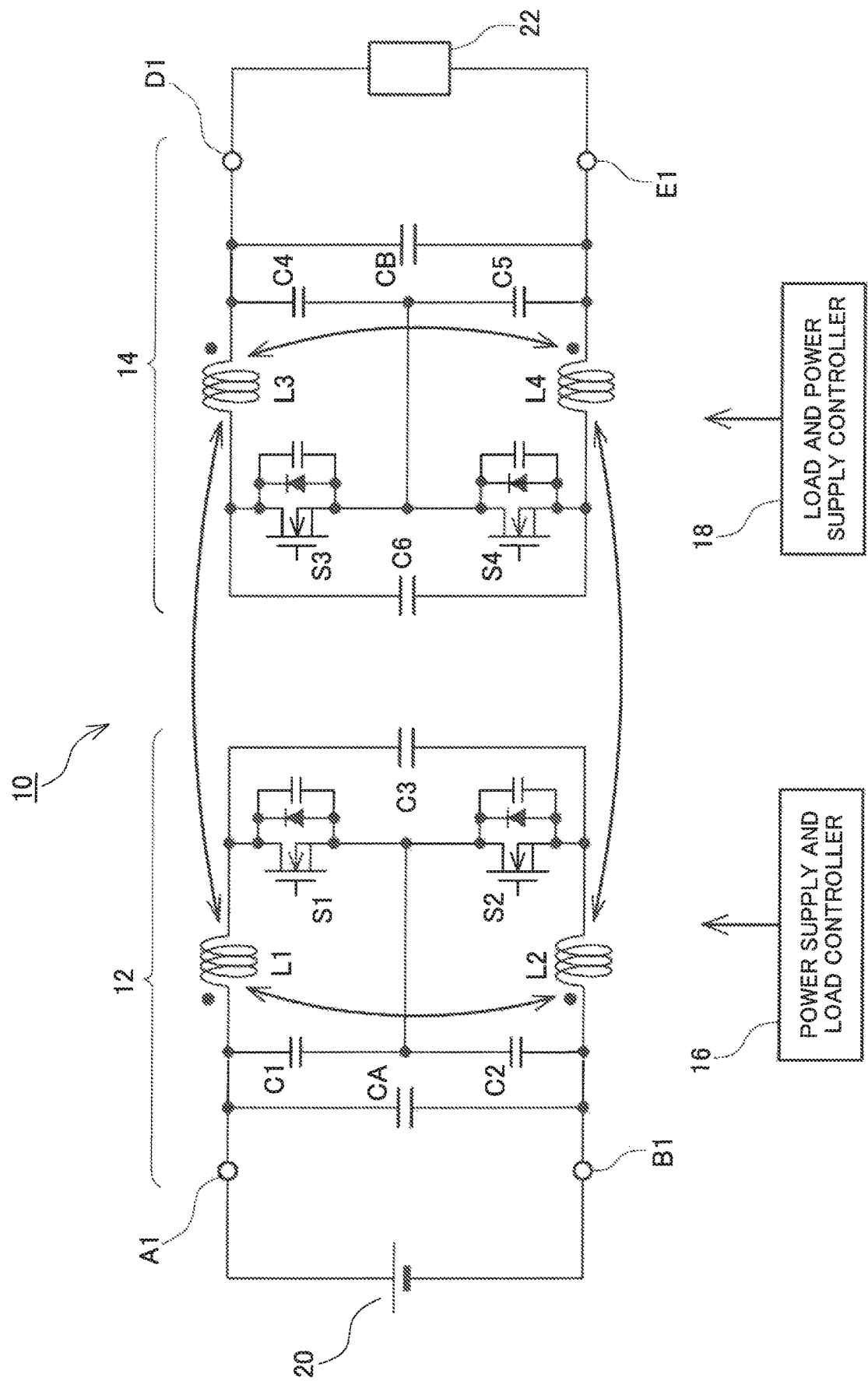
FIG. 1 is a diagram illustrating a power conversion apparatus.

FIG. 1 illustrates an exemplary configuration of a power conversion apparatus 10 according to an embodiment of the present disclosure. The power conversion apparatus 10 includes a power supply and load switching circuit 12, a load and power supply switching circuit 14, a power supply and load controller 16, and a load and power supply controller 18. The power supply and load switching circuit 12 is connected to a DC power source 20, and the load and power supply switching circuit 14 is connected to a load circuit 22. The DC power source 20 can be a stabilized power supply circuit that converts AC electric power obtained from a commercial power source into DC electric power, or can be batteries. The load circuit 22 can be an electric device or an industrial machine. The load circuit 22 may include a power source. In the case of adopting the power conversion apparatus 10 for the V2G technology, the DC power source 20 corresponds to batteries mounted on an automotive vehicle and the load circuit 22 corresponds to a power system.

The power supply and load switching circuit 12 includes switching elements S1 and S2. The power supply and load controller 16 performs switching of each switching element. The load and power supply switching circuit 14 includes switching element S3 and S4. The load and power supply controller 18 controls these switching elements. The power supply and load switching circuit 12 and the load and power supply switching circuit 14 are magnetically coupled through windings involved therein. Performing switching of the power supply and load switching circuit 12 and the load and power supply switching circuit 14 can supply electric power from the DC power source 20 to the load circuit 22.

An exemplary configuration of the power conversion apparatus 10 will be described in detail. The power supply and load switching circuit 12 includes a first primary winding L1, a second primary winding L2, a first capacitor C1, a second capacitor C2, a third capacitor C3, a primary capacitor CA, the first switching element S1, and the second switching element S2. For each switching element, a field effect transistor, a bipolar transistor, an insulated gate bipolar transistor (IGBT) or the like may be used. The same is applied to each switching element described below.

The first primary winding L1 and the first switching element S1 are connected in series, and the first capacitor C1 is connected in parallel with this serially connected part. Similarly, the second primary winding L2 and the second switching element S2 are connected in series, and the second capacitor C2 is connected in parallel with this serially connected part. A connection point (connection wire) of the first switching element S1 and the first capacitor C1 is connected to a connection point (connection wire) of the second switching element S2 and the second capacitor C2. The third capacitor C3 is connected between a connection point of the first primary winding L1 and the first switching element S1 and a connection point of the second primary winding L2 and the second switching element S2. The primary capacitor CA is connected between a connection point of the first primary winding L1 and the first capacitor C1 and a connection point of the second primary winding L2 and the second capacitor C2. A diode having a cathode connected to the first primary winding L1 and a capacitor are connected in parallel with the first switching element S1. A diode having an anode connected to the second primary winding L2 and a capacitor are connected in parallel with the second switching element S2. Further, a positive electrode terminal A1 is provided at the connection point of the first primary winding L1 and the first capacitor C1 and a negative electrode terminal B1 is provided at the connection point of the second primary winding L2 and the second capacitor C2. The DC power source 20 is connected between the positive electrode terminal A1 and the negative electrode terminal B1.

The first primary winding L1 and the second primary winding L2 are magnetically coupled. When an induced electromotive force being positive on the side indicated by a dot is generated in the first primary winding L1, an induced electromotive force being positive on the side indicated by a dot is generated in the second primary winding L2. Similarly, when an induced electromotive force being positive on the side indicated by a dot is generated in the second primary winding L2, an induced electromotive force being positive on the side indicated by a dot is generated in the first primary winding L1.

The load and power supply switching circuit 14 includes a first secondary winding L3, a second secondary winding L4, a fourth capacitor C4, a fifth capacitor C5, a sixth capacitor C6, a secondary capacitor CB, the third switching element S3, and the fourth switching element S4. The load and power supply switching circuit 14 and the power supply and load switching circuit 12 are similar to each other in configuration.

The first secondary winding L3 and the second secondary winding L4 correspond to the first primary winding L1 and the second primary winding L2, respectively. The fourth capacitor C4, the fifth capacitor C5, and the sixth capacitor C6 correspond to the first capacitor C1, the second capacitor C2, and third capacitor C3, respectively. The third switching element S3 and the fourth switching element S4 correspond to the first switching element S1 and the second switching element S2, respectively. The secondary capacitor CB corresponds to the primary capacitor CA.

The first primary winding L1 and the first secondary winding L3 are magnetically coupled. Similarly, the second primary winding L2 and the second secondary winding L4 are magnetically coupled. When an induced electromotive force being positive on the side indicated by a dot is generated in the first primary winding L1, an induced electromotive force being positive on the side indicated by a dot is generated in the first secondary winding L3. Similarly, when an induced electromotive force being positive on the side indicated by a dot is generated in the first secondary winding L3, an induced electromotive force being positive on the side indicated by a dot is generated in the first primary winding L1. The same is applied to the second primary winding L2 and the second secondary winding L4.

The power supply and load controller 16 controls the first switching element S1 and the second switching element S2 so as to alternately turn on and off repetitively. More specifically, when the first switching element S1 is ON, the second switching element S2 is OFF. When the first switching element S1 is OFF, the second switching element S2 is ON. Similarly, the load and power supply controller 18 controls the third switching element S3 and the fourth switching element S4 so as to alternately turn on and off repetitively.

Advancing on-off phases of the first switching element S1 and the second switching element S2 with respect to on-off phases of the third switching element S3 and the fourth switching element S4 can supply electric power from the power supply and load switching circuit 12 to the load and power supply switching circuit 14. More specifically, this causes transmission of electric power from the DC power source 20 to the power supply and load switching circuit 12, transmission of electric power from the power supply and load switching circuit 12 to the load and power supply switching circuit 14, and transmission of electric power from the load and power supply switching circuit 14 to the load circuit 22.

When the power supply and load switching circuit 12 and the load and power supply switching circuit 14 perform switching in phase, no electric power is transmitted between the power supply and load switching circuit 12 and the load and power supply switching circuit 14. More specifically, the electric power supplied from the DC power source 20 to the load circuit 22 is 0.

Delaying switching phase of the power supply and load switching circuit 12 with respect to switching phase of the load and power supply switching circuit 14 can supply electric power from the load and power supply switching circuit 14 to the power supply and load switching circuit 12. More specifically, this cases transmission of electric power from the load circuit 22 to the load and power supply switching circuit 14, transmission of electric power from the load and power supply switching circuit 14 to the power supply and load switching circuit 12, and transmission of electric power from the power supply and load switching circuit 12 to the DC power source 20. However, this power transmission is performed when the load circuit 22 has a power generation source.

As mentioned above, in the power conversion apparatus 10, the electric power to be transmitted from the DC power source 20 to the load circuit 22, or from the load circuit 22 to the DC power source 20, is determined according to a switching phase difference, which is obtained by subtracting the switching phase of the load and power supply switching circuit 14 from the switching phase of the power supply and load switching circuit 12.

Figure 2:
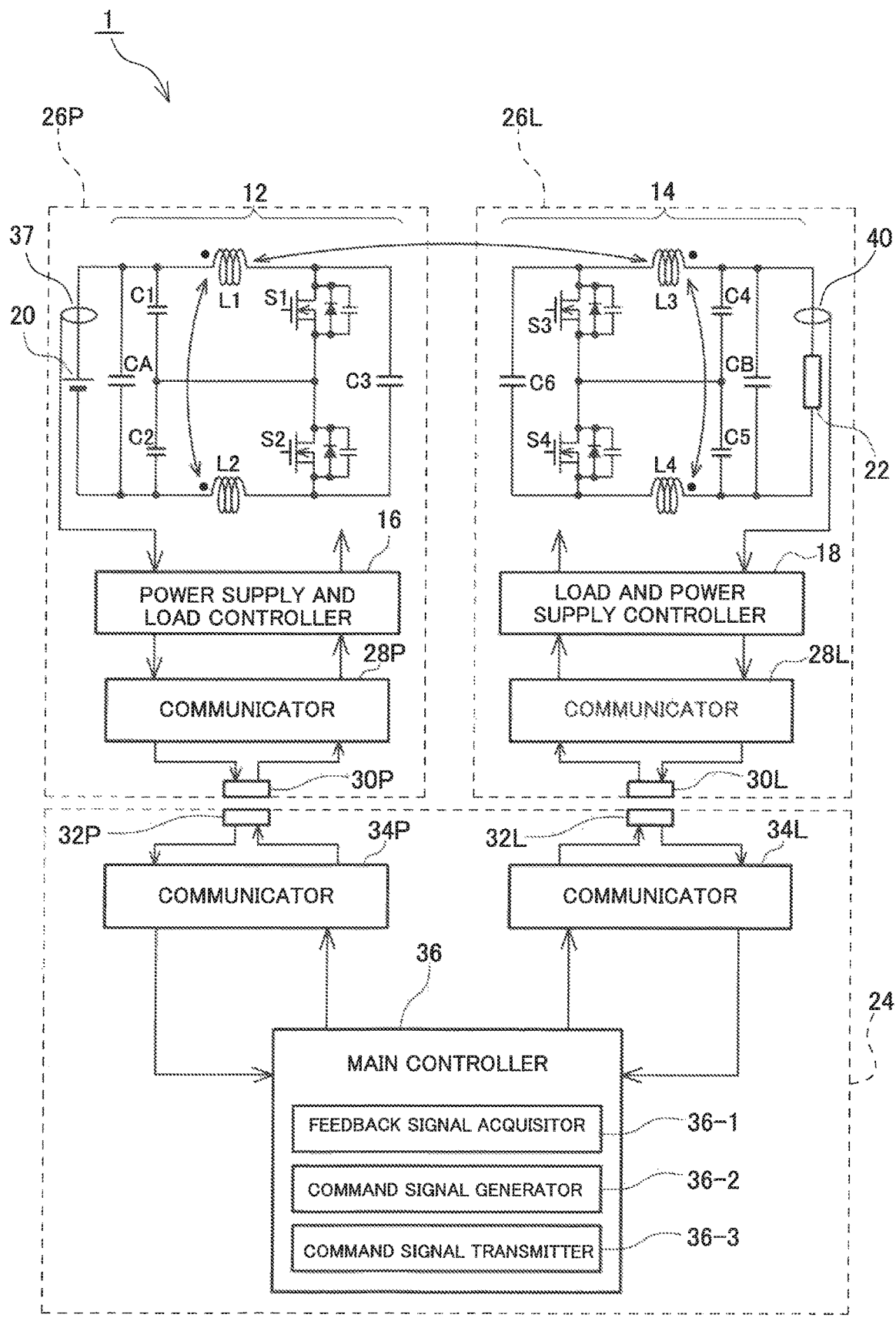
FIG. 2 is a diagram illustrating a power conversion system.

FIG. 2 illustrates an exemplary configuration of a power conversion system 1 that includes the power conversion apparatus 10 illustrated in FIG. 1. The power conversion system 1 is a system for supplying electric power from the DC power source 20 to the load circuit 22, in which a switching control apparatus 24 controls the power supply and load switching circuit 12 and the load and power supply switching circuit 14 by contactless communication using no electric wiring. Constituent components identical to those illustrated in FIG. 1 are denoted by the same reference numerals and explanation thereof is omitted.

The power conversion system 1 includes a power supply switching unit 26P and a load switching unit 26L in addition to the switching control apparatus 24. The power supply switching unit 26P includes the power supply and load controller 16, a communicator 28P, a coupling conductive element 30P, and a power supply sensor 37, in addition to the DC power source 20 and the power supply and load switching circuit 12. The load switching unit 26L includes a communicator 28L, a coupling conductive element 30L, and a load sensor 40, in addition to the load and power supply switching circuit 14 and the load circuit 22. The switching control apparatus 24 includes a main controller 36, a communicator 34P, a communicator 34L, and coupling conductive elements 32P and 32L.

The coupling conductive element 30P is connected to the communicator 28P of the power supply switching unit 26P, and the coupling conductive element 32P is connected to the communicator 34P of the switching control apparatus 24. The coupling conductive elements 30P and 32P are formed of, for example, belt-like conductors. In this case, the coupling conductive elements 30P and 32P are arranged so as to face each other and are electrically or magnetically coupled with each other in a mechanically contactless state. The signal output from the communicator 28P to the coupling conductive element 30P is transmitted to the communicator 34P via the coupling conductive element 32P, and the signal output from the communicator 34P to the coupling conductive element 32P is transmitted to the communicator 28P via the coupling conductive element 30P. As a result, signal transmission/reception is performed between the communicator 28P and the communicator 34P.

Similarly, the coupling conductive element 30L is connected to the communicator 28L of the load switching unit 26L, and the coupling conductive element 32L is connected to the communicator 34L of the switching control apparatus 24. The coupling conductive elements 30L and 32L are formed of, for example, belt-like conductors. The coupling conductive elements 30L and 32L are arranged so as to face each other and are electrically or magnetically coupled with each other in a mechanically contactless state. The signal output from the communicator 28L to the coupling conductive element 30L is transmitted to the communicator 34L via the coupling conductive element 32L, and the signal output from the communicator 34L to the coupling conductive element 32L is transmitted to the communicator 28L via the coupling conductive element 30L. As a result, signal transmission/reception is performed between the communicator 28L and the communicator 34L.

The main controller 36 outputs a power supply switching command signal, which defines switching timing of the power supply and load switching circuit 12, to the communicator 34P. The communicator 34P transmits the power supply switching command signal to the communicator 28P. The communicator 28P receives the power supply switching command signal and outputs it to the power supply and load controller 16. The power supply and load controller 16 performs switching control for the switching elements S1 and S2 at the timing instructed by the power supply switching command signal. More specifically, the switching elements S1 and S2 are controlled from ON to OFF, or from OFF to ON.

Similarly, the main controller 36 outputs a load switching command signal, which defines switching timing of the load and power supply switching circuit 14, to the communicator 34L. The communicator 34L transmits the load switching command signal to the communicator 28L. The communicator 28L receives the load switching command signal and outputs it to the load and power supply controller 18. The load and power supply controller 18 performs switching control for the switching elements S3 and S4 at the timing instructed by the load switching command signal.

The path extending from the positive electrode terminal of the DC power source 20 to the power supply and load switching circuit 12 is provided with the power supply sensor 37. The power supply sensor 37 detects the voltage applied from the DC power source 20 to the power supply and load switching circuit 12. Further, the power supply sensor 37 detects the current flowing into the power supply and load switching circuit 12 from the DC power source 20, or the current flowing out from the power supply and load switching circuit 12 to the DC power source 20. The power supply sensor 37 outputs a voltage detection value and a current detection value to the power supply and load controller 16. The power supply and load controller 16 generates a power supply feedback signal including the voltage detection value and the current detection value and outputs the generated power supply feedback signal to the communicator 28P. The communicator 28P transmits the power supply feedback signal to the communicator 34P. The communicator 34P receives the power supply feedback signal and outputs it to the main controller 36.

The load circuit 22 is provided with the load sensor 40. The load sensor 40 detects the current flowing into the load circuit 22 from the load and power supply switching circuit 14, or the current flowing out from the load circuit 22 to the load and power supply switching circuit 14. Further, the load sensor 40 detects the voltage applied from the load and power supply switching circuit 14 to the load circuit 22. The load sensor 40 generates a load feedback signal including a voltage detection value and a current detection value, and outputs the generated load feedback signal to the communicator 28L. The communicator 28L transmits the load feedback signal to the communicator 34L. The communicator 34L receives the load feedback signal and outputs it to the main controller 36.

The main controller 36 measures the electric power transmitted from the power supply and load switching circuit 12 to the load and power supply switching circuit 14 based on the power supply feedback signal or the load feedback signal. The main controller 36 obtains a control value, which is an absolute value of a value obtained by subtracting a target value from the obtained power measurement value, and generates a power supply switching command signal and a load switching command signal so as to reduce the control value.

The main controller 36 transmits the power supply switching command signal to the power supply and load controller 16 via the communicators 34P and 28P, and transmits the load switching command signal to the load and power supply controller 18 via the communicators 34L and 28L. The power supply and load controller 16 switches the power supply and load switching circuit 12 at the timing instructed by the power supply switching command signal, and the load and power supply controller 18 switches the load and power supply switching circuit 14 at the timing instructed by the load switching command signal. Through such processing, the main controller 36 adjusts the above-mentioned switching phase difference so that the electric power transmitted from the DC power source 20 to the load circuit 22 approaches or matches the target value.

In addition to the electric power transmitted from the DC power source 20 to the load circuit 22, the main controller 36 may adjust the switching phase difference so that the following physical values approach the respective target values.

(1) The current flowing from the DC power source 20 into the power supply and load switching circuit 12, or the current flowing out from the power supply and load switching circuit 12 to the DC power source 20.

(2) The current flowing from the load and power supply switching circuit 14 into the load circuit 22, or the current flowing out from the load circuit 22 to the load and power supply switching circuit 14.

(3) The voltage applied from the load and power supply switching circuit 14 to the load circuit 22.

In the power conversion system 1, the power transmission from the power supply switching unit 26P to the load switching unit 26L is performed contactlessly without intervention of wiring. Further, signal transmission/reception between the switching control apparatus 24 and the power supply switching unit 26P and signal transmission/reception between the switching control apparatus 24 and the load switching unit 26L are performed contactlessly without intervention of wiring. As a result, the wiring structure of the power conversion system 1 can be simplified.

Figure 3A:
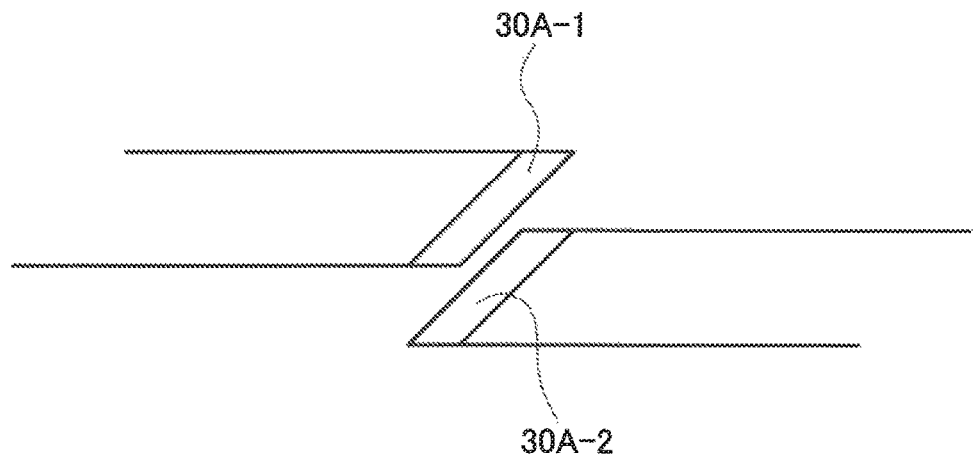
FIG. 3A is a diagram illustrating an exemplary pair of coupling conductive elements.
Figure 3B:
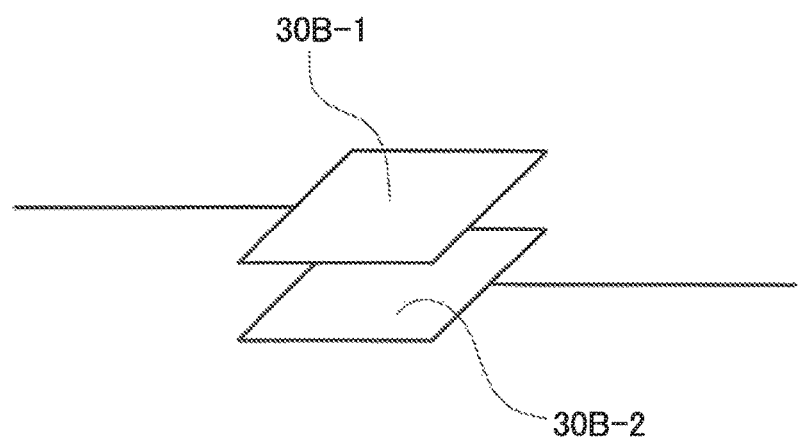
FIG. 3B is a diagram illustrating an exemplary pair of coupling conductive elements.
Figure 3C:
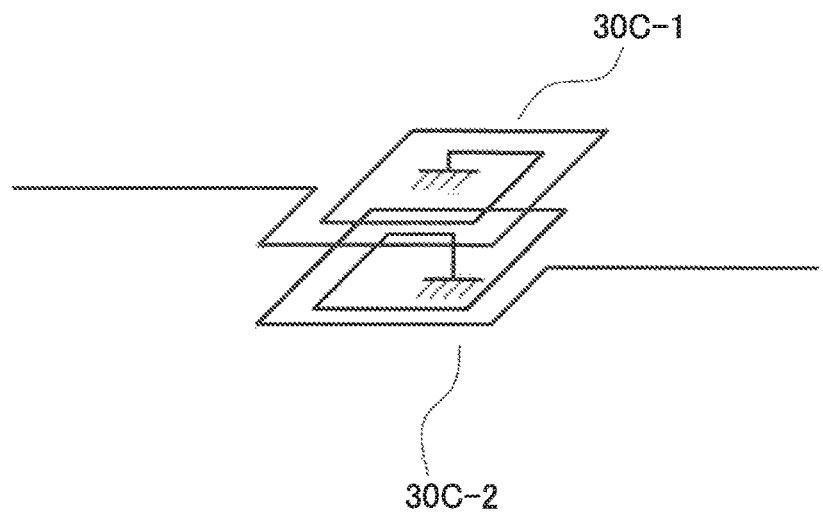
FIG. 3C is a diagram illustrating an exemplary pair of coupling conductive elements.

Each of FIGS. 3A to 3C illustrates an exemplary pair of coupling conductive elements provided between two communicators for signal transmission. The example illustrated in FIG. 3A is a pair of coupling conductive elements 30A-1 and 30A-2 each being formed by a belt-like conductor. The coupling conductive elements 30A-1 and 30A-2 are arranged so as to face each other and are electrically or magnetically coupled with each other in a mechanically contactless state. A pair of conductor wires for signal transmission in a balanced mode is connected to both ends of each coupling conductive element (30A-1 or 30A-2). The balanced mode is a mode in which the signal is transmitted by a pair of conductor wires other than a grounding conductor.

The example illustrated in FIG. 3B is a pair of coupling conductive elements 30B-1 and 30B-2 each being formed of a rectangular planer conductor. The coupling conductive elements 30B-1 and 30B-2 have plate surfaces arranged so as to face each other and are electrically or magnetically coupled with each other in a mechanically contactless state. A conductor wire for signal transmission is connected to each coupling conductive element.

The example illustrated in FIG. 3C is a pair of coupling conductive elements 30C-1 and 30C-2 each being formed of a planar coil. The coupling conductive elements 30C-1 and 30C-2 have coil conductors each forming a swirl-like shape and arranged so as to face each other and are electrically, magnetically or electromagnetically coupled with each other in a mechanically contactless state. A conductor wire for signal transmission is connected to each coupling conductive element.

The coupling conductive elements illustrated in each of FIGS. 3A to 3C may be formed on dielectric substrates. In this case, by placing a substrate on which one coupling conductive element is provided so as to face a substrate on which the other coupling conductive element is provided, the pair of coupling conductive elements can be coupled with each other.

The pair of coupling conductive elements has high-pass filter characteristics not passing DC components. Therefore, the communicator acquiring a signal from one of the pair of coupling conductive elements may include a waveform shaping circuit such as a hysteresis comparator. The hysteresis comparator sets the output value to an upper limit value when the input signal increases and exceeds a first threshold TH1, and sets the output value to a lower limit value when the input signal decreases and falls below a second threshold TH2 smaller than the first threshold TH1.

As mentioned above, the switching control apparatus 24 according to the present embodiment includes the coupling conductive element 32P (first contactless coupling element) contactlessly coupling with the coupling conductive element 30P (coupling element) included in the power supply switching unit 26P (first switching unit), and the coupling conductive element 32L (second contactless coupling element) contactlessly coupling with the coupling conductive element 30L (coupling element) included in the load switching unit 26L (second switching unit).

The main controller 36 is, for example, configured by a processor and, by executing a program, internally configures each of a feedback signal acquisitor 36-1, a command signal generator 36-2, and a command signal transmitter 36-3, which are described in detail below.

The feedback signal acquisitor 36-1 acquires the power supply feedback signal (feedback signal) corresponding to the electric power transmitted from the power supply switching unit 26P to the load switching unit 26L, via the coupling conductive element 32P and the communicator 34P, from the power supply switching unit 26P. Alternatively, the feedback signal acquisitor 36-1 acquires the load feedback signal (feedback signal) corresponding to the electric power transmitted from the power supply switching unit 26P to the load switching unit 26L, via the coupling conductive element 32L and the communicator 34L, from the load switching unit 26L.

The command signal generator 36-2 generates a power supply switching command signal (first switching command signal) for the power supply switching unit 26P and a load switching command signal (second switching command signal) for the load switching unit 26L, based on the power supply feedback signal or the load feedback signal.

The command signal transmitter 36-3 transmits the power supply switching command signal to the power supply switching unit 26P via the communicator 34P and the coupling conductive element 32P, and transmits the load switching command signal to the load switching unit 26L via the communicator 34L and the coupling conductive element 32L.

Further, the main controller 36, by executing a program, configures the following phase adjuster therein. The phase adjuster includes the command signal generator 36-2 and the command signal transmitter 36-3 described above. The phase adjuster adjusts a difference between switching phase of the power supply switching unit 26P and switching phase of the load switching unit 26L based on the power supply feedback signal or the load feedback signal. More specifically, the phase adjuster transmits the power supply switching command signal and the load switching command signal for adjusting the switching phase difference.

The case having been described in the present embodiment is transmitting electric power from the DC power source 20 to the load circuit 22. The control for transmitting electric power from the load circuit 22 to the DC power source 20 may be performed by adjusting the switching phase difference.

Figure 4:
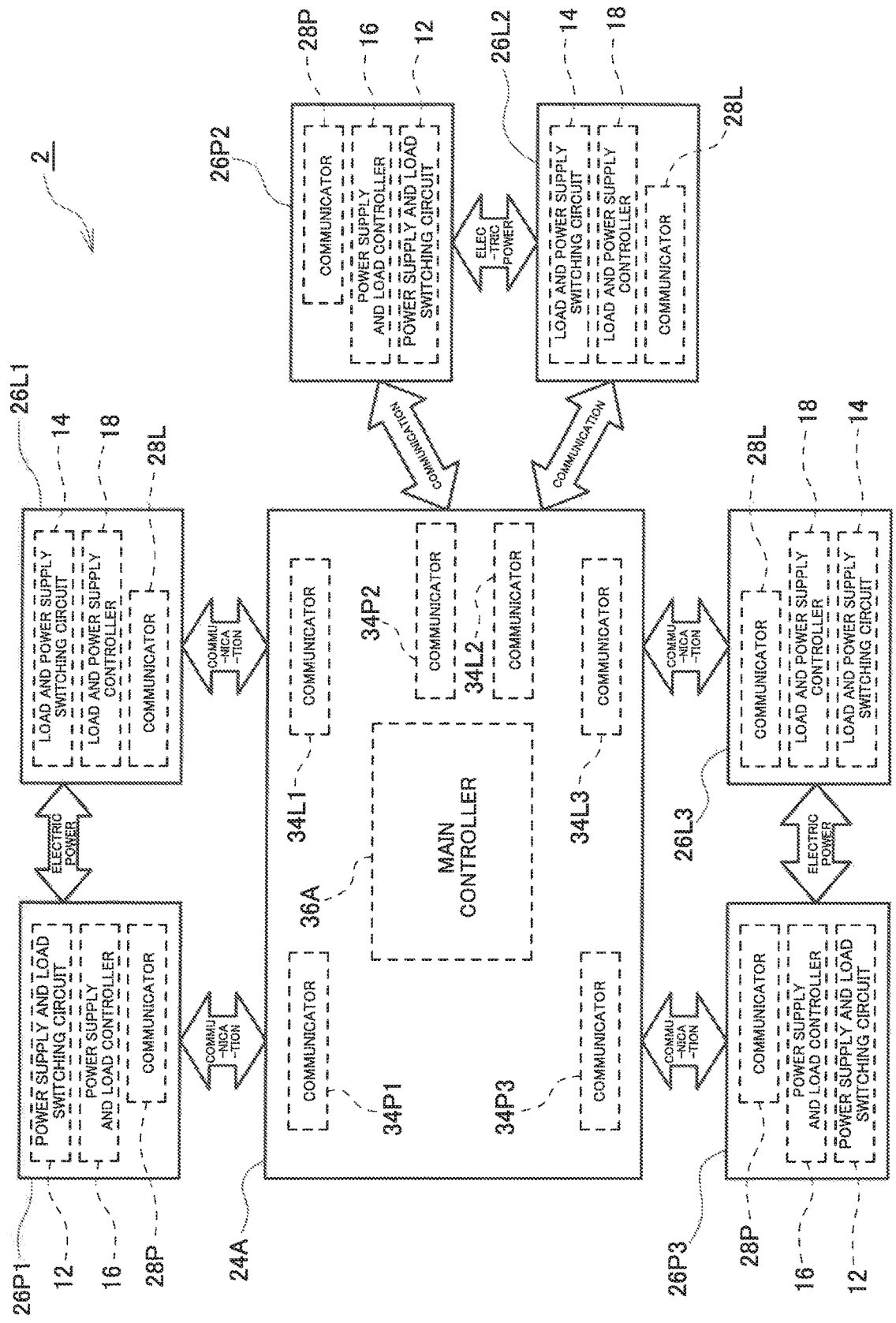
FIG. 4 is a diagram illustrating a power conversion system that controls three power conversion apparatuses.

The switching control apparatus may control a plurality of power conversion apparatuses. FIG. 4 illustrates a power conversion system 2 in which a switching control apparatus 24A controls three power conversion apparatuses. The power conversion system 2 includes a first power supply switching unit 26P1, a first load switching unit 26L1, a second power supply switching unit 26P2, a second load switching unit 26L2, a third power supply switching unit 26P3, and a third load switching unit 26L3, in addition to the switching control apparatus 24A. The i-th power supply switching unit 26Pi (i is an integer from 1 to 3) has the same configuration as the power supply switching unit 26P illustrated in FIG. 2, and the i-th load switching unit 26Li has the same configuration as the load switching unit 26L illustrated in FIG. 2. The power supply and load switching circuit 12 and the power supply and load controller 16 included in the i-th power supply switching unit 26Pi and a load and power supply switching circuit 14 and the load and power supply controller 18 included in the i-th load switching unit 26Li cooperatively configure a single power conversion apparatus.

The switching control apparatus 24A includes a main controller 36A, communicators 34P1 to 34P3, and communicators 34L1 to 34L3. The communicators 34P1 to 34P3 communicate with a communicator 28P included in the first power supply switching unit 26P1 to the third power supply switching unit 26P3, respectively.

The main controller 36A transmits a power supply switching command signal, via each communicator, to the power supply and load controller 16 in each of the first power supply switching unit 26P1 to the third power supply switching unit 26P3. The power supply and load controller 16 in each of the first power supply switching unit 26P1 to the third power supply switching unit 26P3 transmits a power supply feedback signal, via each communicator, to the main controller 36A. The control to be performed by each power supply and load controller 16 for the power supply and load switching circuit 12 is similar to the control to be performed by the power supply and load controller 16 illustrated in FIG. 1 for the power supply and load switching circuit 12.

Similarly, the communicators 34L1 to 34L3 communicate with a communicator 28L included in the first load switching unit 26L1 to the third load switching unit 26L3, respectively. The main controller 36A transmits a load switching command signal, via each communicator, to the load and power supply controller 18 in the first load switching unit 26L1 to the third load switching unit 26L3, respectively. The load and power supply controller 18 in each of the first load switching unit 26L1 to the third load switching unit 26L3 transmits a load feedback signal, via each communicator, to the main controller 36A. The control to be performed by each load and power supply controller 18 for the load and power supply switching circuit 14 is similar to the control to be performed by the load and power supply controller 18 illustrated in FIG. 1 for the load and power supply switching circuit 14.

The main controller 36A generates the power supply switching command signal for the i-th power supply switching unit 26Pi (i=1 to 3) and the load switching command signal for the i-th load switching unit 26Li (i=1 to 3) based on the power supply feedback signal received from each of the first power supply switching unit 26P1 to the third power supply switching unit 26P3, or the load feedback signal received from each of the first load switching unit 26L1 to the third load switching unit 26L3. Then, the main controller 36A transmits the power supply switching command signal generated for the i-th power supply switching unit 26Pi to the i-th power supply switching unit 26Pi and controls the i-th power supply switching unit 26Pi. Further, the main controller 36A transmits the load switching command signal generated for the i-th load switching unit 26Li to the i-th load switching unit 26Li and controls the i-th load switching unit 26Li.

Under the control of the main controller 36A, switching of the i-th power supply switching unit 26Pi and switching of the i-th load switching unit 26Li are synchronized with each other. More specifically, under the control of the main controller 36A, switching frequency of the i-th power supply switching unit 26Pi approaches or matches switching frequency of the i-th load switching unit 26Li. Further, a phase difference obtained by subtracting the switching phase of the i-th load switching unit 26Li from the switching phase of the i-th power supply switching unit 26Pi can be adjusted according to the electric power transmitted from the i-th power supply switching unit 26Pi to the i-th load switching unit 26Li.

Figure 5:
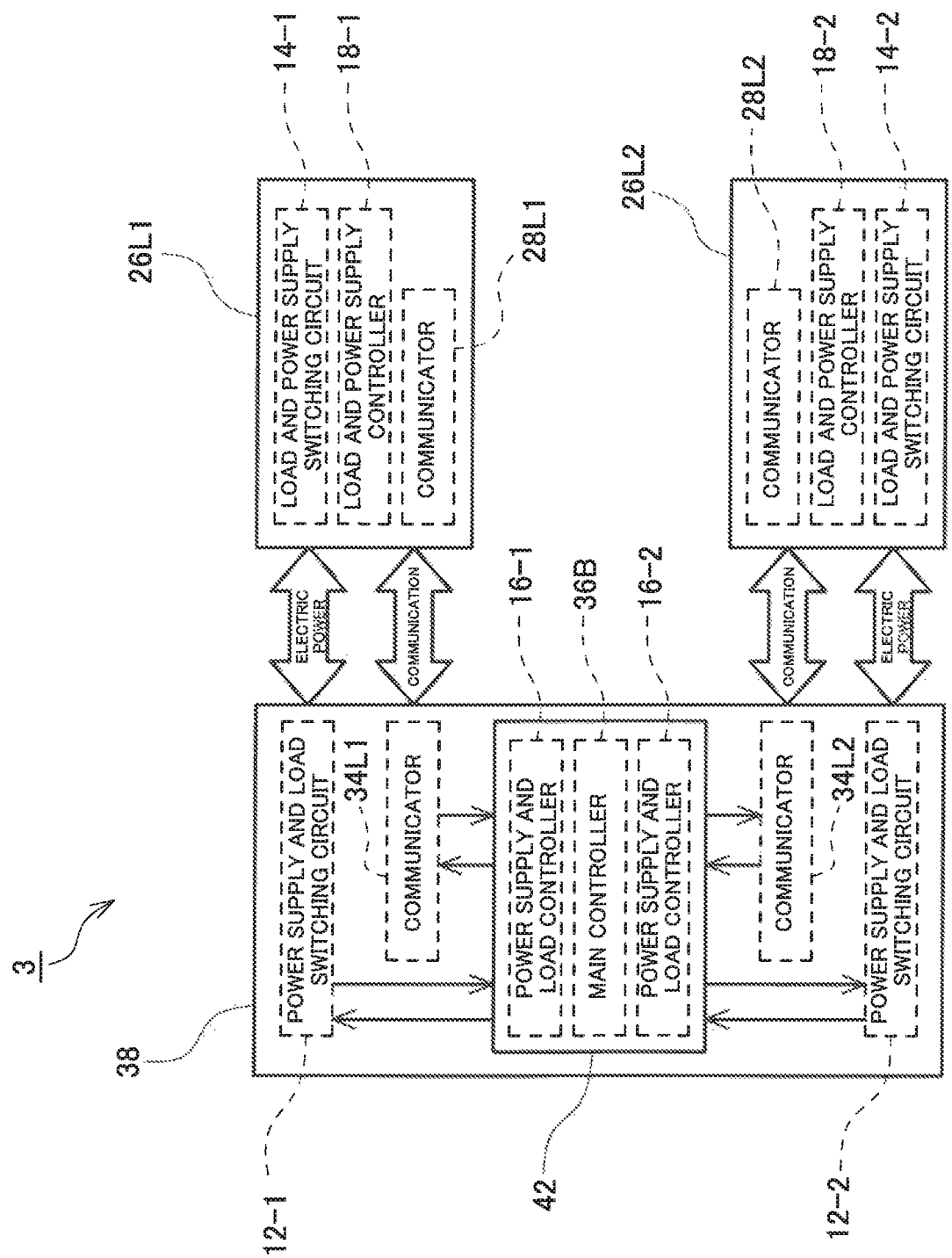
FIG. 5 is a diagram illustrating a power conversion system that controls two power conversion apparatuses.

FIG. 5 illustrates a power conversion system 3 in which a main controller 36B controls two power conversion apparatuses. The power conversion system 3 includes a power supply switching/control apparatus 38, a first load switching unit 26L1, and a second load switching unit 26L2.

The power supply switching/control apparatus 38 includes a controller 42, a power supply and load switching circuit 12-1, a power supply and load switching circuit 12-2, and communicators 34L1 and 34L2. The controller 42 includes power supply and load controllers 16-1 and 16-2 in addition to the main controller 36B.

The main controller 36B and the communicators 34L1 and 34L2 correspond to the switching control apparatus 24 illustrated in FIG. 2. Further, the power supply and load controller 16-1 and the power supply and load switching circuit 12-1 correspond to the power supply switching unit 26P illustrated in FIG. 2. Similarly, the power supply and load controller 16-2 and the power supply and load switching circuit 12-2 correspond to the power supply switching unit 26P illustrated in FIG. 2.

In the power conversion system 3, the controller 42 serving as single unit of hardware configures the power supply and load controller 16-1 for performing switching control of the power supply and load switching circuit 12-1, the power supply and load controller 16-2 for performing switching control of the power supply and load switching circuit 12-2, and the main controller 36B. Further, the power supply switching/control apparatus 38 serving as a single unit of hardware configures the controller 42, the power supply and load switching circuit 12-1, the power supply and load switching circuit 12-2, and the communicators 34L1 and 34L2.

The power supply and load controller 16-1, the power supply and load switching circuit 12-1, the load and power supply controller 18-1, and the load and power supply switching circuit 14-1 cooperatively configure a single power conversion apparatus. The power supply and load controller 16-2, the power supply and load switching circuit 12-2, the load and power supply controller 18-2, and the load and power supply switching circuit 14-2 cooperatively configure another single power conversion apparatus.

The control to be performed by each power supply and load controller (16-1,16-2) for each power supply and load switching circuit (12-1, 12-2) is similar to the control to be performed by the power supply and load controller 16 illustrated in FIG. 1 for the power supply and load switching circuit 12. The main controller 36B outputs a power supply switching command signal to the power supply and load controllers 16-1 and 16-2. The power supply and load controllers 16-1 and 16-2 perform switching control for the power supply and load switching circuits 12-1 and 12-2, respectively, based on the power supply switching command signal. The power supply and load controllers 16-1 and 16-2 acquire a voltage measurement value and a current measurement value from the power supply and load switching circuits 12-1 and 12-2, respectively, and generate power supply feedback signals. The power supply and load controllers 16-1 and 16-2 give the power supply feedback signals to the main controller 36B.

The control to be performed by each load and power supply controller (18-1,18-2) for each load and power supply switching circuit (14-1,14-2) is similar to the control to be performed by the load and power supply controller 18 illustrated in FIG. 1 for the load and power supply switching circuit 14. The communicators 34L1 and 34L2 communicate with a communicator 28L1 of the first load switching unit 26L1 and a communicator 28L2 of the second load switching unit 26L2. The main controller 36B transmits a load switching command signal, via each communicator, to the load and power supply controller 18-1 of the first load switching unit 26L1 and the load and power supply controller 18-2 of the second load switching unit 26L2. The load and power supply controller 18-1 performs switching control for the load and power supply switching circuit 14-1 based on the load switching command signal. The load and power supply controller 18-2 performs switching control for the load and power supply switching circuit 14-2 based on the load switching command signal. The load and power supply controller 18-1 acquires a voltage measurement value and a current measurement value from the load and power supply switching circuit 14-1 and generates a load feedback signal. Further, the load and power supply controller 18-2 acquires a voltage measurement value and a current measurement value from the load and power supply switching circuit 14-2 and generates a load feedback signal. The load and power supply controllers 18-1 and 18-2 output, via each communicator, each load feedback signal to the main controller 36B.

The main controller 36B generates the power supply switching command signal for each of the power supply and load switching circuits 12-1 and 12-2 based on the power supply feedback signal given from the power supply and load controllers 16-1 and 16-2 or the load feedback signal transmitted from each of the first load switching unit 26L1 and the second load switching unit 26L2. Then, each power supply and load switching circuit is controlled by the power supply switching command signal generated for each power supply and load switching circuit.

Further, the main controller 36B generates the load switching command signal for each of the load and power supply switching circuits 14-1 and 14-2 based on the power supply feedback signal given from each of the power supply and load controllers 16-1 and 16-2 or the load feedback signal transmitted from the first load switching unit 26L1 and the second load switching unit 26L2. Then, the main controller 36B transmits the load switching command signal generated for each load and power supply switching circuit to the first load switching unit 26L1 and the second load switching unit 26L2 and controls each load and power supply switching circuit.

Under the control of the main controller 36B, switching of the power supply and load switching circuit 12-$j$ (j is 1 or 2) and switching of the load and power supply switching circuit 14-$j$ are synchronized with each other. More specifically, under the control of the main controller 36B, switching frequency of the power supply and load switching circuit 12-$j$ approaches or matches switching frequency of the load and power supply switching circuit 14-$j$. Further, a phase difference obtained by subtracting the switching phase of the load and power supply switching circuit 14-$j$ from the switching phase of the power supply and load switching circuit 12-$j$ can be adjusted according to the electric power transmitted from the power supply and load switching circuit 12-$j$ to the load and power supply switching circuit 14-$j$.

In the above-mentioned embodiment, the main controller 36B contactlessly communicates with the load and power supply controller 18-1 via the communicators 34L1 and 28L1, and the main controller 36B communicates with the load and power supply controller 18-2 via the communicators 34L2 and 28L2. Further, in addition to the main controller 36B, the power supply and load controllers 16-1 and 16-2 are configured in the controller 42. The main controller 36B directly transmits and receives signals to and from the power supply and load controllers 16-1 and 16-2.

The above-mentioned configuration may be replaced by a configuration in which the main controller 36B contactlessly communicates with the power supply and load controllers 16-1 and 16-2. Further, the main controller 36B may be configured to include the load and power supply controllers 18-1 and 18-2 in addition to the main controller 36B so that the controller can directly transmit and receive signals to and from the load and power supply controllers 18-1 and 18-2.

Figure 6:
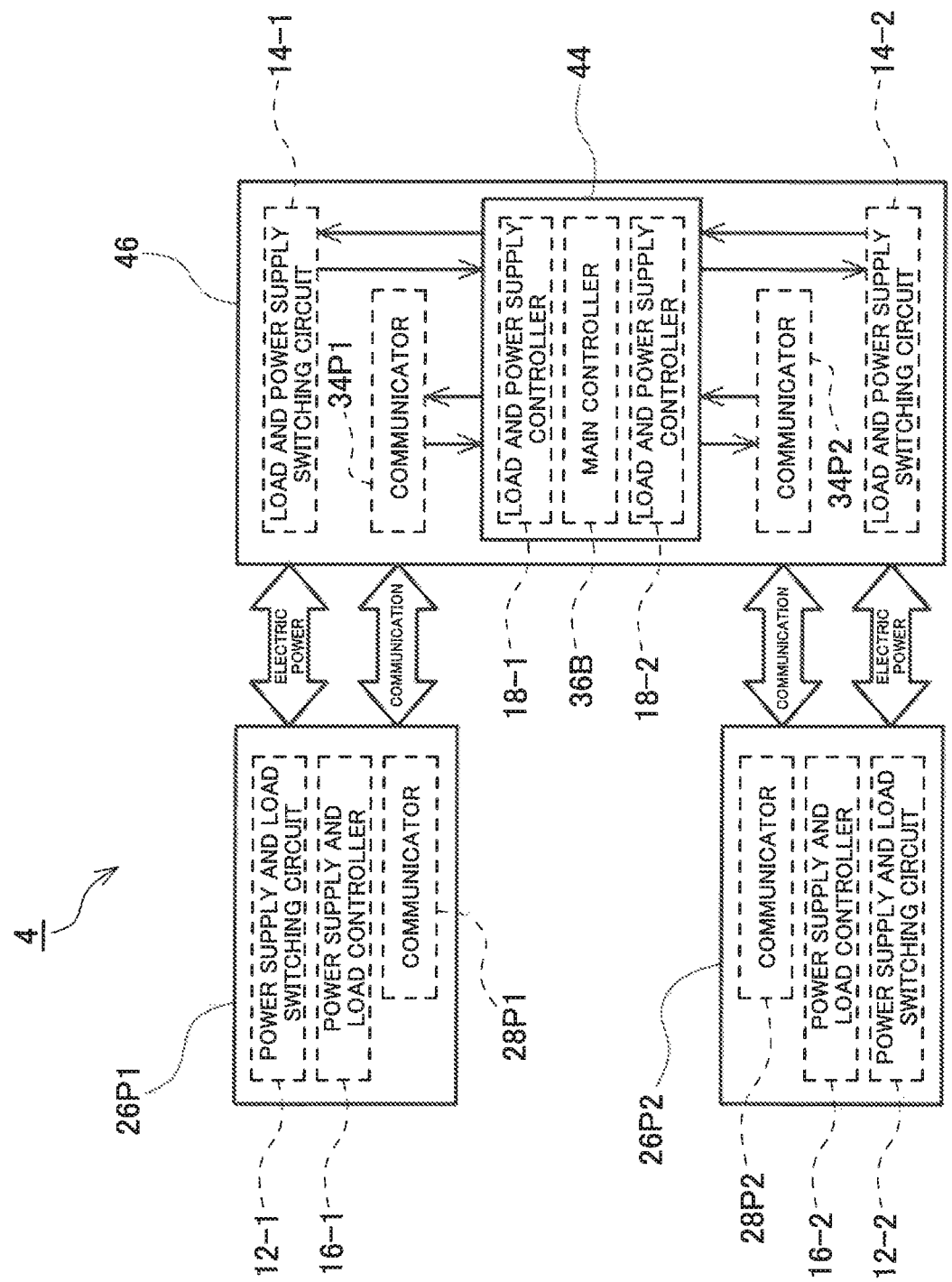
FIG. 6 is a diagram illustrating a power conversion system that controls two power conversion apparatuses.

FIG. 6 illustrates such a power conversion system 4. Constituent components identical to those illustrated in FIG. 4 are denoted by the same reference numerals and explanation thereof is omitted. The power conversion system 4 includes a load switching/control apparatus 46, a first power supply switching unit 26P1, and a second power supply switching unit 26P2.

The load switching/control apparatus 46 includes a controller 44, a load and power supply switching circuit 14-1, a load and power supply switching circuit 14-2, and communicators 34P1 and 34P2. The controller 44 includes a main controller 36B and load and power supply controllers 18-1 and 18-2.

In the power conversion system 4, the controller 44 serving as a single unit of hardware configures the load and power supply controller 18-1 for performing switching control of the load and power supply switching circuit 14-1, the load and power supply controller 18-2 for performing switching control of the load and power supply switching circuit 14-2, and the main controller 36B. Further, the load switching/control apparatus 46 serving as a single unit of hardware configures the controller 44, the load and power supply switching circuit 14-1, the load and power supply switching circuit 14-2, and the communicators 34P1 and 34P2.

The main controller 36B and the communicators 34P1 and 34P2 correspond to the switching control apparatus 24 illustrated in FIG. 2. Further, the load and power supply controller 18-1 and the load and power supply switching circuit 14-1 correspond to the load switching unit 26L illustrated in FIG. 2. Similarly, the load and power supply controller 18-2 and the load and power supply switching circuit 14-2 correspond to the load switching unit 26L illustrated in FIG. 2.

The main controller 36B contactlessly communicates with the power supply and load controller 16-1 via the communicators 34P1 and 28P1, and communicates with the power supply and load controller 16-2 via the communicators 34P2 and 28P2. Further, in addition to the main controller 36B, the load and power supply controllers 18-1 and 18-2 are configured in the controller 44. The main controller 36B directly transmits and receives signals to and from the load and power supply controllers 18-1 and 18-2.

Figure 7:
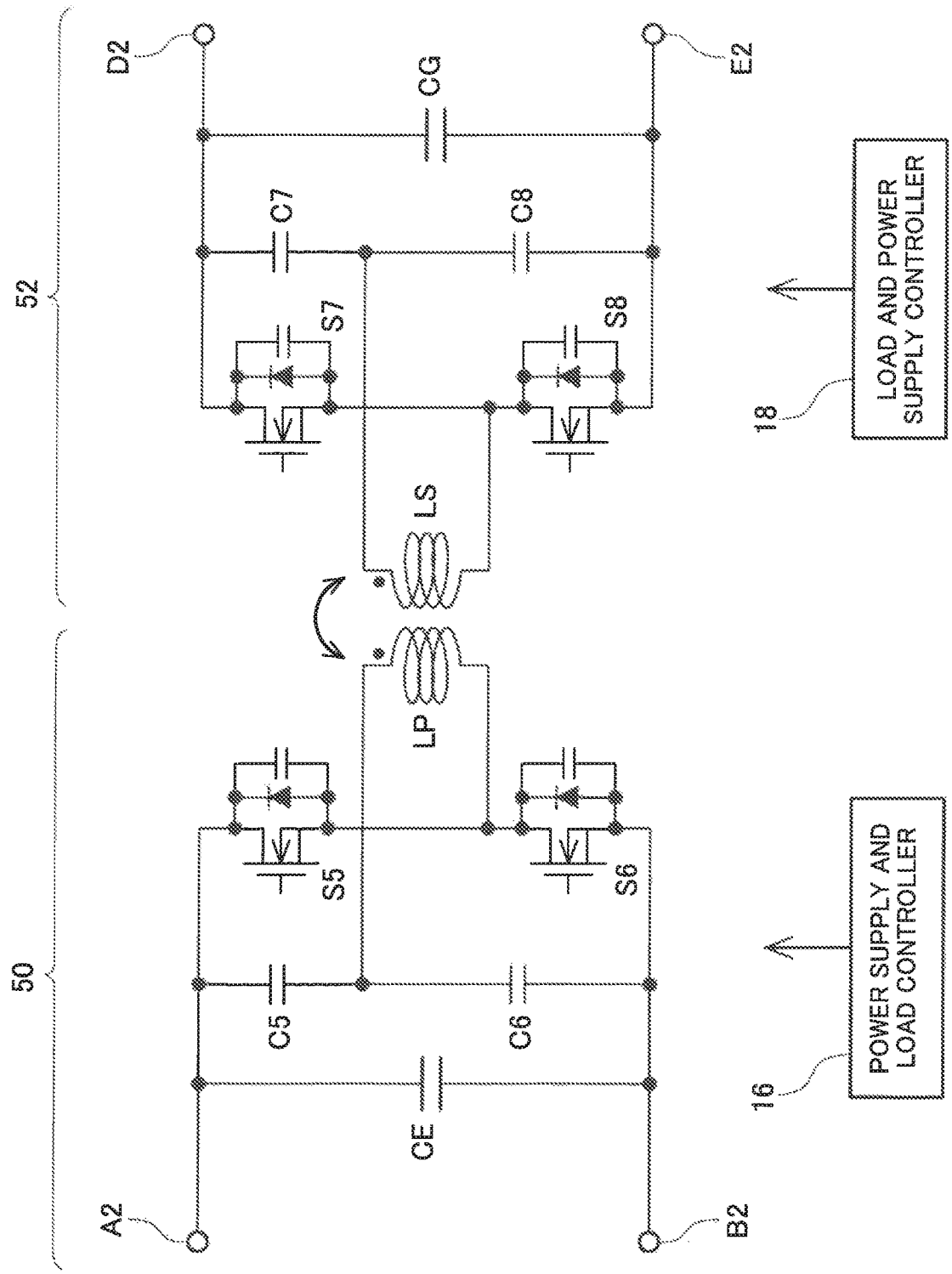
FIG. 7 is a diagram illustrating a power conversion apparatus that includes half-bridge type switching circuits.

The power supply and load switching circuit (12, 12-1, and 12-2) and the load and power supply switching circuit (14, 14-1, and 14-2) described above may be replaced by a half-bridge type power supply and load switching circuit 50 and a half-bridge type load and power supply switching circuit 52 illustrated in FIG. 7, respectively. "Half-bridge" refers to a circuit configuration of two switching elements connected in series and is described as "HB" in the following description.

The HB type power supply and load switching circuit 50 includes an upper switching element S5, a lower switching element S6, an upper capacitor C5, a lower capacitor C6, an inter-terminal capacitor CE, a primary winding LP, a positive electrode terminal A2, and a negative electrode terminal B2. One end of the upper switching element S5 is connected to the positive electrode terminal A2. One end of the lower switching element S6 is connected to the negative electrode terminal B2. The other end of the upper switching element S5 and the other end of the lower switching element S6 are commonly connected. A diode having an anode connected to the lower switching element S6 and a capacitor are connected in parallel with the upper switching element S5. A diode having a cathode connected to the upper switching element S5 and a capacitor are connected in parallel with the lower switching element S6. One end of the upper capacitor C5 is connected to the positive electrode terminal A2. One end of the lower capacitor C6 is connected to the negative electrode terminal B2. The other end of the upper capacitor C5 and the other end of the lower capacitor C6 are commonly connected. The primary winding LP is connected between a connection point of the upper switching element S5 and the lower switching element S6 and a connection point of the upper capacitor C5 and the lower capacitor C6. The inter-terminal capacitor CE is connected between the positive electrode terminal A2 and the negative electrode terminal B2.

The power supply and load controller 16 alternately turns on and off the upper switching element S5 and the lower switching element S6. As a result, an induced electromotive force generated by the primary winding LP is applied to the upper capacitor C5 and the lower capacitor C6, and the upper capacitor C5 and the lower capacitor C6 are charged. A voltage being a sum of an inter-terminal voltage of the upper capacitor C5 and an inter-terminal voltage of the lower capacitor C6 is applied to the inter-terminal capacitor CE to charge it. Further, the power supply and load controller 16 alternately turns on and off the upper switching element S5 and the lower switching element S6, so that a charging voltage of the upper capacitor C5 and a charging voltage of the lower capacitor C6 are alternately applied to the primary winding LP.

The HB type load and power supply switching circuit 52 includes an upper switching element S7, a lower switching element S8, an upper capacitor C7, a lower capacitor C8, an inter-terminal capacitor CG, a secondary winding LS, a positive electrode terminal D2, and a negative electrode terminal E2. The HB type load and power supply switching circuit 52 has a configuration similar to that of the HB type power supply and load switching circuit 50. The upper switching element S7 and the lower switching element S8 correspond to the upper switching element S5 and the lower switching element S6, respectively. The upper capacitor C7, the lower capacitor C8, and the inter-terminal capacitor CG correspond to the upper capacitor C5, the lower capacitor C6, and the inter-terminal capacitor CE, respectively. The secondary winding LS corresponds to the primary winding LP and is magnetically coupled with the primary winding LP. Further, the positive electrode terminal D2 and the negative electrode terminal E2 correspond to the positive electrode terminal A2 and the negative electrode terminal B2, respectively.

Similar to the power supply and load controller 16, the load and power supply controller 18 alternately turns on and off the upper switching element S7 and the lower switching element S8.

Differentiating the phase of primary side switching timing from the phase of secondary side switching timing can supply electric power from the HB type power supply and load switching circuit 50 to the HB type load and power supply switching circuit 52, or can supply electric power from the HB type load and power supply switching circuit 52 to the HB type power supply and load switching circuit 50. More specifically, the electric power input from the positive electrode terminal A2 and the negative electrode terminal B2 is output from the positive electrode terminal D2 and the negative electrode terminal E2, or the electric power input from the positive electrode terminal D2 and the negative electrode terminal E2 is output from the positive electrode terminal A2 and the negative electrode terminal B2.

Figure 8:
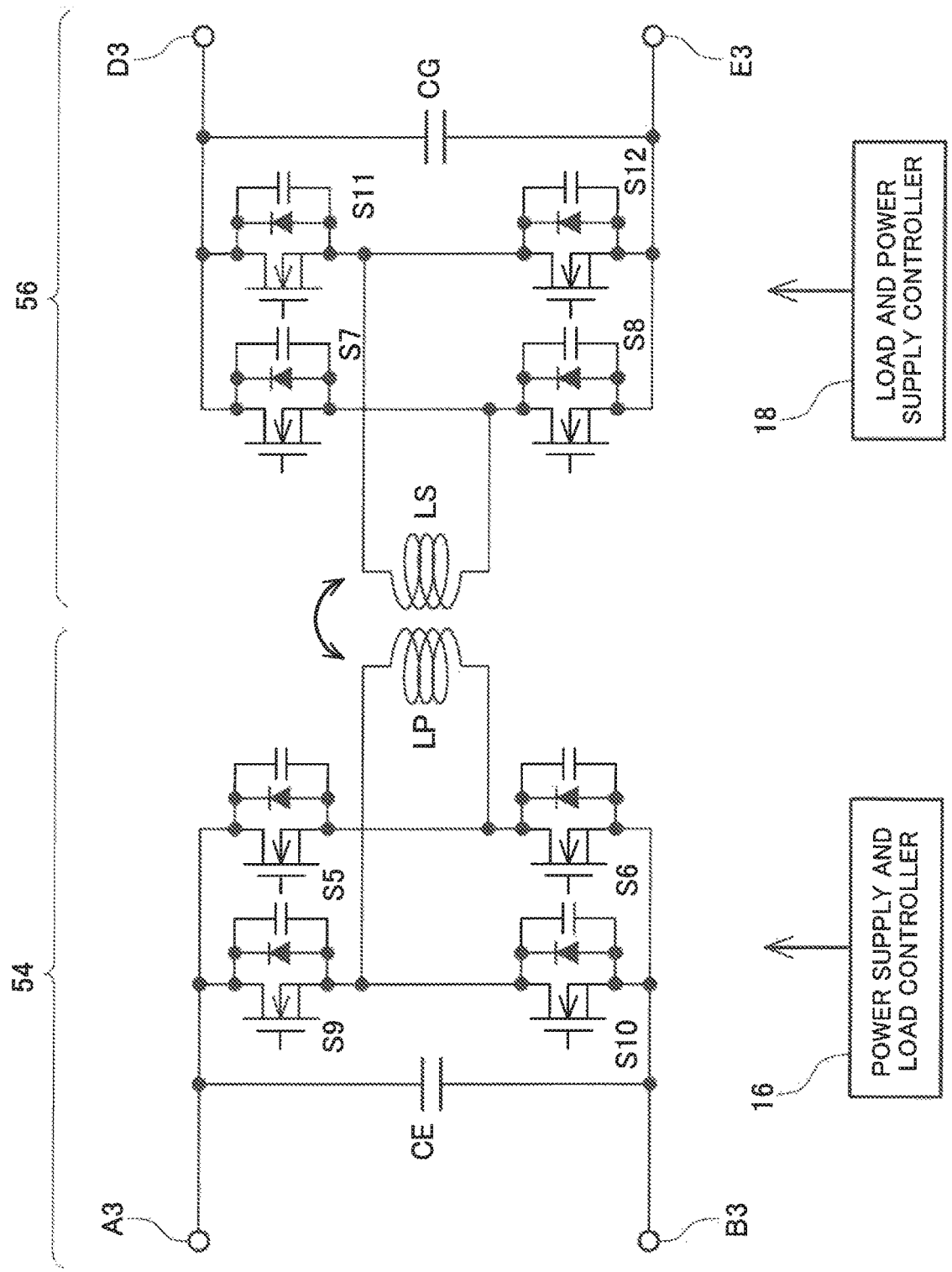
FIG. 8 is a diagram illustrating a power conversion apparatus that includes full-bridge type switching circuits.

The power supply and load switching circuit (12, 12-1, and 12-2) and the load and power supply switching circuit (14, 14-1, and 14-2) described above may be replaced by a full-bridge type power supply and load switching circuit 54 and a full-bridge type load and power supply switching circuit 56 illustrated in FIG. 8, respectively. "Full-bridge" refers to a circuit configuration of a parallel connection of two series connection elements, in which one series connection element is constituted by two switching elements connected in series, and is described as "FB" in the following description. This circuit is the one obtainable by replacing the upper capacitor C5 and the lower capacitor C6 illustrated in FIG. 7 by a second upper switching element S9 and a second lower switching element S10, respectively, and replacing the upper capacitor C7 and the lower capacitor C8 by a second upper switching element S11 and a second lower switching element S12, respectively.

The power supply and load controller 16 alternately turns on and off the upper switching element S5 and the lower switching element S6, and also alternately turns on and off the second upper switching element S9 and the second lower switching element S10. The power supply and load controller 16 differentiates the phase of switching timing for the upper switching element S5 and the lower switching element S6 from the phase of switching timing for the second upper switching element S9 and the second lower switching element S10, for example, by 180°.

Similarly, the load and power supply controller 18 alternately turns on and off the upper switching element S7 and the lower switching element S8, and also alternately turns on and off the second upper switching element S11 and the second lower switching element S12. The load and power supply controller 18 differentiates the phase of switching timing for the upper switching element S7 and the lower switching element S8 from the phase of switching timing for the second upper switching element S11 and the second lower switching element S12, for example, by 180°.

Differentiating the phase of primary side switching timing from the phase of secondary side switching timing can output the electric power input from a positive electrode terminal A3 and a negative electrode terminal B3 from a positive electrode terminal D3 and a negative electrode terminal E3, and can output the electric power input from the positive electrode terminal D3 and the negative electrode terminal E3 from the positive electrode terminal A3 and the negative electrode terminal B3.

Figure 9:
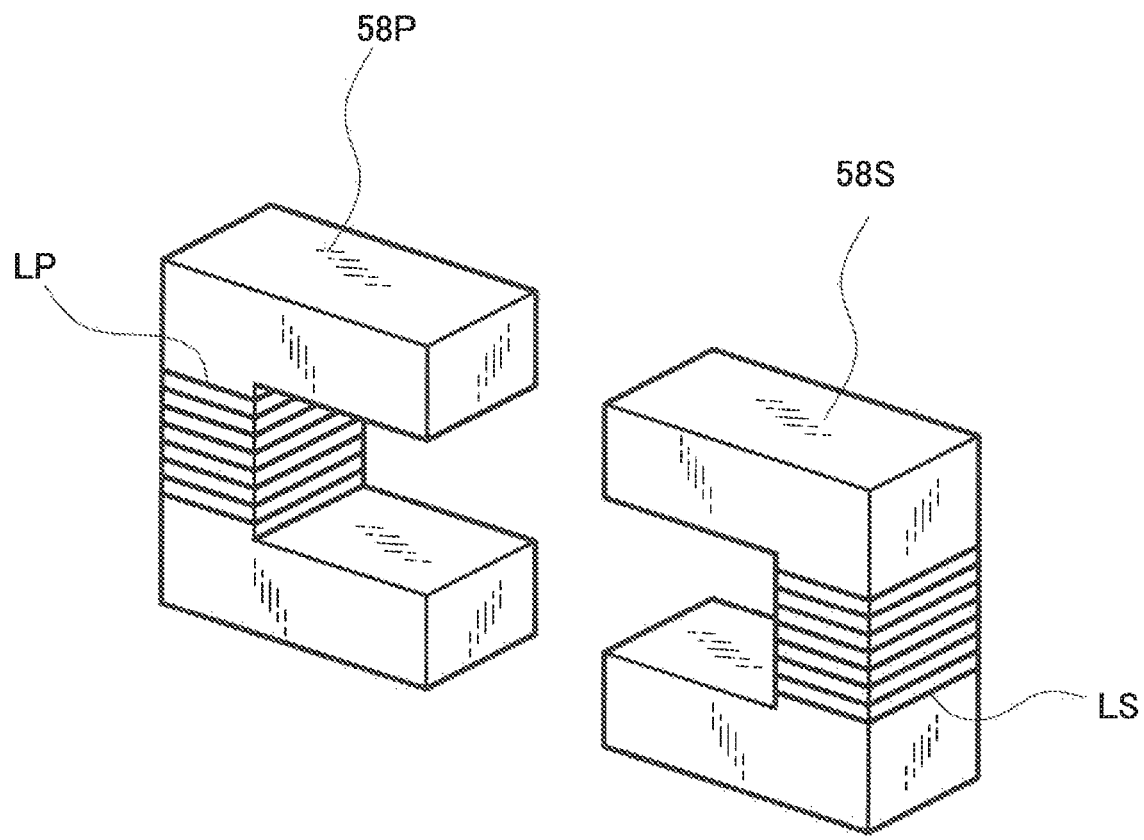
FIG. 9 is a diagram illustrating an exemplary configuration including U-shaped cores for coupling primary and secondary windings.

FIG. 9 illustrates an exemplary configuration in which the primary winding LP and the secondary winding LS are magnetically coupled. A conducting wire wound around a U-shaped core 58P constitutes the primary winding LP. Similarly, a conducting wire wound around a U-shaped core 58S constitutes the secondary winding LS. The U-shaped core 58P constituting the primary winding LP and the U-shaped core 58S constituting the secondary winding LS are arranged in such a manner that their U-shaped open sides face each other. As a result, a magnetic path through which the magnetic flux generated from the primary winding LP and interlinking with the secondary winding LS passes is configured in the U-shaped core 58P, and a magnetic path through which the magnetic flux generated from the secondary winding LS and interlinking with the primary winding LP passes is configured in the U-shaped core 58S.

The first primary winding L1 and the second primary winding L2 illustrated in FIG. 1 may be configured by winding conducting wires configuring these windings around a single U-shaped core 58P. Further, the first secondary winding L3 and the second secondary winding L4 illustrated in FIG. 1 may be configured by winding conducting wires configuring these windings around a single U-shaped core 58S.

Figure 10:
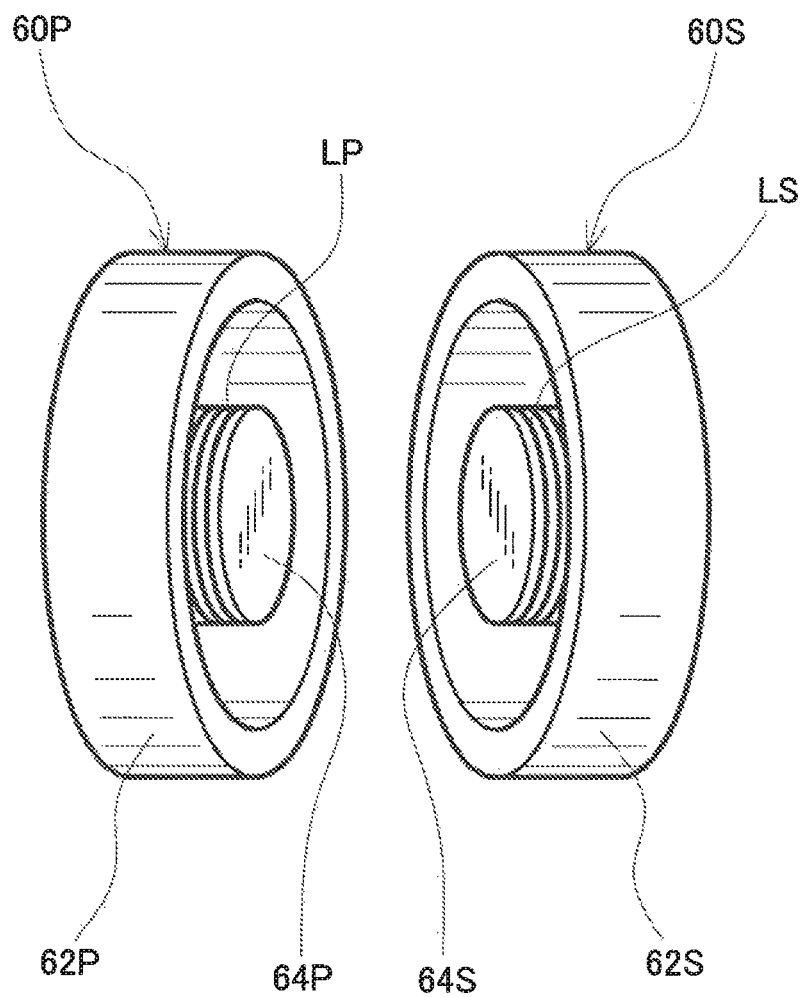
FIG. 10 is a diagram illustrating an exemplary configuration including container-like cores for coupling primary and secondary windings.

FIG. 10 illustrates another exemplary configuration in which the primary winding LP and the secondary winding LS are magnetically coupled. A primary side container-like core 60P, in which the primary winding LP is configured, has a structure in which a cylindrical internal core 64P is coaxially disposed inside a cylindrical container-like external core 62P. The internal core 64P is joined to an inner bottom surface of the external core 62P. The external core 62P and the internal core 64P may be integrally configured. The conducting wire configuring the primary winding LP is wound around the internal core 64P.

Similarly, a secondary side container-like core 60S, in which the secondary winding LS is configured, has a structure in which a cylindrical internal core 64S is coaxially disposed inside a cylindrical container-like external core 62S. The conducting wire configuring the secondary winding LS is wound around the internal core 64S. The primary side container-like core 60P and the secondary side container-like core 60S are arranged in such a manner that their openings face each other. As a result, there is formed a magnetic path through which the magnetic flux generated from the primary winding LP and interlinking with the secondary winding LS passes, as well as a magnetic path through which the magnetic flux generated from the secondary winding LS and interlinking with the primary winding LP passes. The magnetic path: (1) extends from the internal core 64P to a cylindrical side wall of the external core 62P via the bottom surface of the external core 62P; (2) then passes the cylindrical side wall of the external core 62P and reaches a gap formed between an edge of the external core 62P and an edge of the external core 62S; (3) then, passes a side wall of the external core 62S from the gap and extends from a bottom surface thereof to the internal core 64S; (4) and further, passes the internal core 64S and reaches a gap formed between a distal end of the internal core 64S and a distal end of the internal core 64P. Forming such a magnetic path can enhance the magnetic coupling between the primary winding LP and the secondary winding LS.

The first primary winding L1 and the second primary winding L2 illustrated in FIG. 1 may be configured by winding conductive wires configuring these windings around the same internal core 64P. Similarly, the first secondary winding L3 and the second secondary winding L4 illustrated in FIG. 1 may be configured by winding conductive wires configuring these windings around the same internal core 64S.

The primary side container-like core 60P in which the primary winding LP is provided may be used for a magnetic coupling type connector. The secondary side container-like core 60S in which the secondary winding LS is provided may be used for an electromagnetic coupling type plug.

Figure 11:
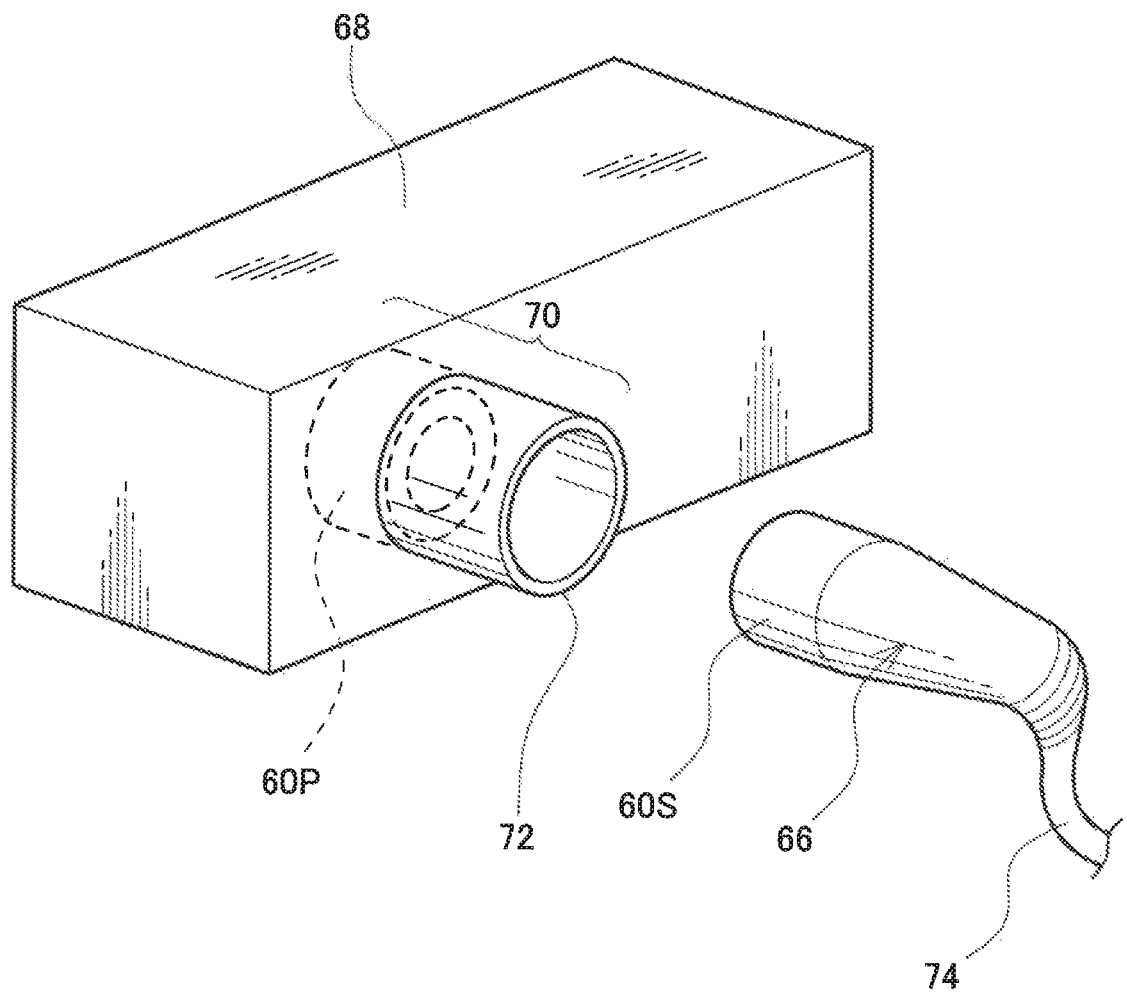
FIG. 11 is a diagram illustrating an exemplary structure for connecting a magnetic coupling type plug with a magnetic coupling type connector.

FIG. 11 illustrates a structure for connecting a magnetic coupling type plug 66 to a magnetic coupling type connector 70. As illustrated in this drawing, a housing 68 of the power supply switching unit is provided with the magnetic coupling type connector 70. The magnetic coupling type connector 70 includes a reception tube 72 for receiving the magnetic coupling type plug 66. The reception tube 72 protrudes from a front face of the housing 68. A primary side container-like core 60P, in which the primary winding is configured, is attached to the innermost end of the reception tube 72.

A cable 74 is pulled out from a load switching unit, and the magnetic coupling type plug 66 is attached to a distal end of the cable 74. A secondary side container-like core 60S, in which the secondary winding is configured, is attached to a distal end of the magnetic coupling type plug 66. Inserting the magnetic coupling type plug 66 into the reception tube 72 can magnetically couple the primary winding and the secondary winding so that electric power is supplied from the power supply switching unit to the load switching unit.

Figure 12:
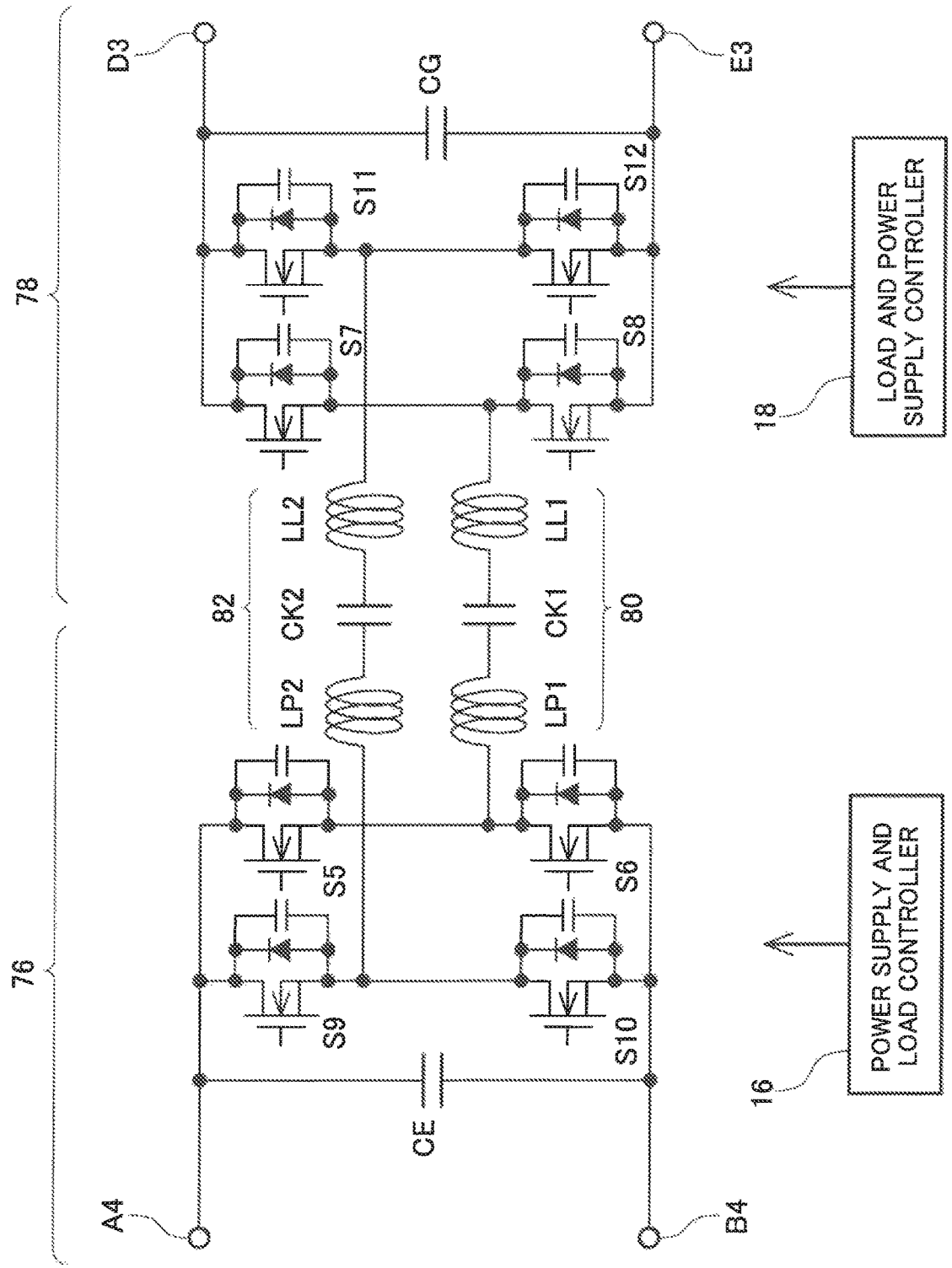
FIG. 12 is a diagram illustrating a power conversion apparatus including a FB power supply and load switching circuit and a FB load and power supply switching circuit coupled by two series resonance circuits.

FIG. 12 illustrates a power conversion apparatus including an FB power supply and load switching circuit 76 and a FB load and power supply switching circuit 78 coupled by two series resonance circuits. A series resonance circuit 80 is connected between a connection point of switching elements S5 and S6 and a connection point of switching elements S7 and S8. A series resonance circuit 82 is connected between a connection point of switching elements S9 and S10 and a connection point of switching elements S11 and S12.

The series resonance circuit 80 includes a power supply side inductor LP1, a coupling capacitor Ck1, and a load side inductor LL1 that are connected in series. The power supply side inductor LP1 is included in the FB power supply and load switching circuit 76, and the load side inductor LL1 is included in the FB load and power supply switching circuit 78. Further, one conductor configuring the coupling capacitor Ck1 is included in the FB power supply and load switching circuit 76, and the other conductor is included in the FB load and power supply switching circuit 78.

The series resonance circuit 82 includes a power supply side inductor LP2, a coupling capacitor Ck2, and a load side inductor LL2 that are connected in series. The power supply side inductor LP2 is included in the FB power supply and load switching circuit 76, and the load side inductor LL2 is included in the FB load and power supply switching circuit 78. Further, one conductor configuring the coupling capacitor Ck2 is included in the FB power supply and load switching circuit 76, and the other conductor is included in the FB load and power supply switching circuit 78.

The switching control of each switching element of the power conversion apparatus illustrated in FIG. 12 is similar to that performed by the power conversion apparatus illustrated in FIG. 8.

Figure 13:
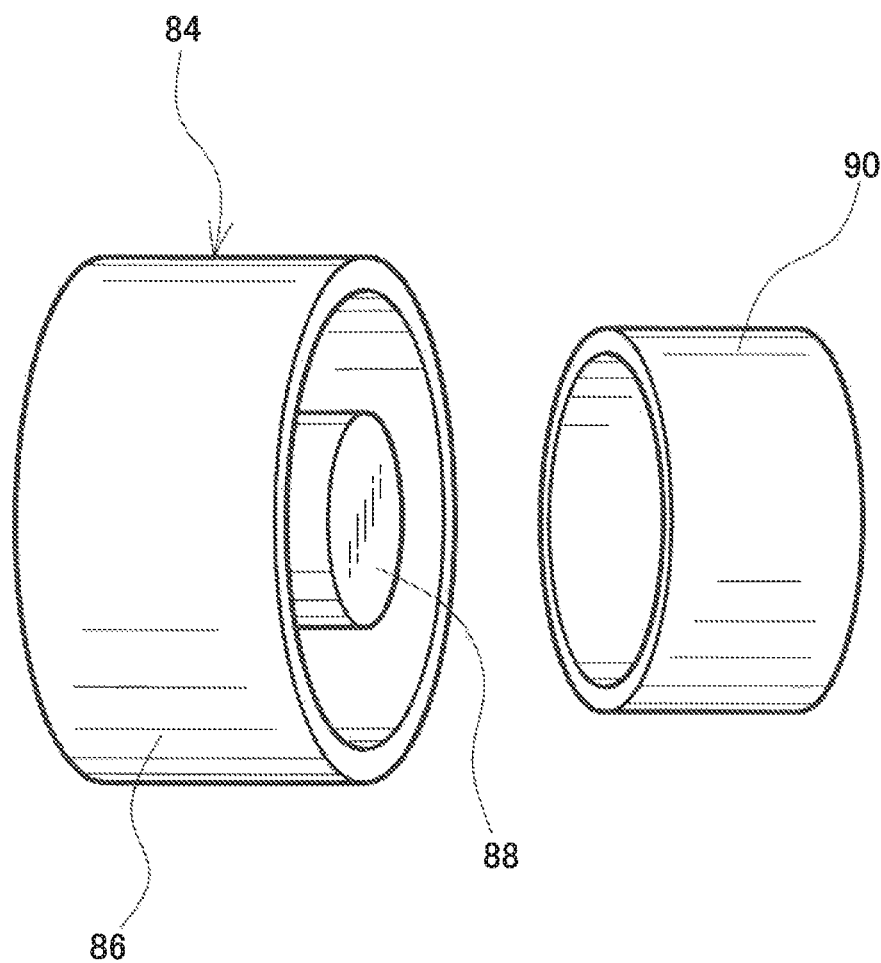
FIG. 13 is a diagram illustrating a coupling capacitor configured by a container-like conductor and a cylindrical container conductor.

A pair of conductor plates facing each other may configure each of the coupling capacitors Ck1 and Ck2. Further, the coupling capacitors Ck1 and Ck2 may have a structure illustrated in FIG. 13. One container-like conductor 84 configuring the coupling capacitor has a structure including a cylindrical internal conductor 88 coaxially arranged inside a cylindrical container-like external conductor 86. The internal conductor 88 is joined to a bottom surface of the external conductor 86. The external conductor 86 and the internal conductor 88 may be integrally formed. Another cylindrical container conductor 90 configuring the coupling capacitor has a container shape with one cylindrical end closed and is formed of a conductor. The coupling capacitor can be configured by inserting the cylindrical container conductor 90 contactlessly between the external conductor 86 and the internal conductor 88 of the container-like conductor 84.

The container-like conductor 84 and the cylindrical container conductor 90 may be used as connectors for connecting the FB power supply and load switching circuit 76 and the FB load and power supply switching circuit 78. In this case, the container-like conductor 84 is connected to each of one end of the power supply side inductor LP1 on the side opposite to the connection point of the switching elements S5 and S6 and one end of the power supply side inductor LP2 on the side opposite to the connection point of the switching elements S9 and S10. Further, a cable is pulled out from one end of the load side inductor LL1 on the side opposite to the connection point of the switching elements S7 and S8, and the cylindrical container conductor 90 is connected to the distal end thereof. Similarly, a cable is pulled out from one end of the load side inductor LL2 on the side opposite to the connection point of the switching elements S11 and S12, and the cylindrical container conductor 90 is connected to the distal end thereof. The cylindrical container conductor 90 connected to the distal end of the cable pulled out from one end of the load side inductor LL1 is inserted contactlessly into the container-like conductor 84 connected to one end of the power supply side inductor LP1. Similarly, the cylindrical container conductor 90 connected to the distal end of the cable pulled out from the one end of the load side inductor LL2 is inserted contactlessly into the container-like conductor 84 connected to one end of the power supply side inductor LP2.

The above-mentioned power conversion system may be adopted in a contactless power supply system for electric cars and/or hybrid cars. In the contactless power supply system, a contactless power supply device is installed on a service station, and a contactless power reception device is mounted on an automotive vehicle. The automotive vehicle stops at the service station and receives electric power, which is transmitted from the contactless power supply device, via the contactless power reception device and charges batteries.

The power supply switching unit of the power conversion system may be used for the contactless power supply device. The load switching unit of the power conversion system may be used for the contactless power reception device.

Figure 14:
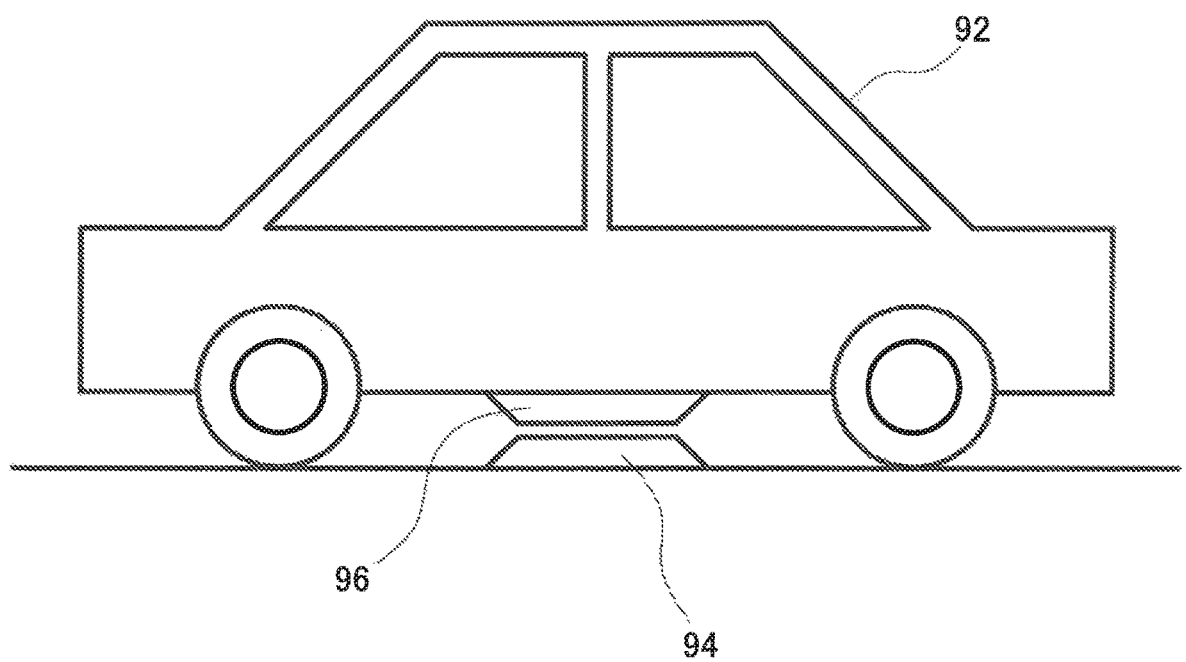
FIG. 14 is a diagram illustrating a contactless power supply system for an automotive vehicle.

As illustrated in FIG. 14, a power transmission side coupler 94 of the power supply switching unit is arranged at the position wherein an automotive vehicle 92 stops. The power transmission side coupler 94 includes a primary winding (the first primary winding L1 and the second primary winding L2 of the power conversion system 1 illustrated in FIG. 1) and a coupling conductive element. Further, a power reception side coupler 96 is provided at a bottom part of the automotive vehicle 92. The power reception side coupler 96 includes a secondary winding (the first secondary winding L3 and the second secondary winding L4 of the power conversion system 1 illustrated in FIG. 1) and a coupling conductive element.

The automotive vehicle 92 stops at the service station so that the power reception side coupler 96 comes close to the power transmission side coupler 94. The power supply switching unit included in the contactless power supply device communicates with the load switching unit included in the contactless power reception device via the power transmission side coupler 94 and the power reception side coupler 96 and transmits electric power to the load switching unit. The electric power acquired by the load switching unit charges batteries of the automotive vehicle.

The system illustrated in FIG. 14 may be adopted for the V2G technology. In this case, electric power is supplied from the contactless power reception device mounted on the automotive vehicle to the contactless power supply device provided in a parking space and the electric power is supplied to a power system. Further, electric power is supplied from the power system to the contactless power supply device provided in the parking space, and electric power is supplied from the contactless power supply device to the contactless power reception device mounted on the automotive vehicle.

Further, the power conversion system may be used for a mobile body such as a robot that autonomously moves to a place where a charging device is installed and autonomously charges its own batteries. The charging device is equipped with a power supply switching unit. Further, the mobile body is equipped with a load switching unit. Similar to the contactless power supply system illustrated in FIG. 14, a power transmission side coupler is attached to the charging device and a power reception side coupler is attached to the mobile body. The mobile body autonomously moves to the place where the charging device is installed when the charging amount of the batteries thereof is reduced. Then, the power reception side coupler stops at a position adjacent to the power transmission side coupler of the charging device. The power supply switching unit included in the charging device communicates with the load switching unit included in the mobile body via the power transmission side coupler and the power reception side coupler, and transmits electric power to the load switching unit. The electric power acquired by the load switching unit charges the batteries of the mobile body.

The invention claimed is:

1. A switching control apparatus for controlling a first switching unit and a second switching unit that contactlessly acquires electric power from the first switching unit, comprising:
   a first contactless coupling element configured to contactlessly couple with a coupling element included in the first switching unit;
   a second contactless coupling element configured to contactlessly couple with a coupling element included in the second switching unit;
   a feedback signal acquisitor configured to acquire a feedback signal corresponding to the electric power transmitted from the first switching unit to the second switching unit, from the first switching unit via the first contactless coupling element, or from the second switching unit via the second contactless coupling element;
   a command signal generator configured to generate a first switching command signal for the first switching unit and a second switching command signal for the second switching unit, based on the feedback signal; and
   a command signal transmitter configured to transmit the first switching command signal to the first switching unit via the first contactless coupling element and transmit the second switching command signal to the second switching unit via the second contactless coupling element,
   wherein the first switching unit and the second switching unit perform switching at timings corresponding to the first switching command signal and the second switching command signal, respectively.

2. The switching control apparatus according to claim 1, wherein there is provided a phase adjuster including the command signal generator and the command signal transmitter and configured to adjust a difference between switching phase of the first switching unit and switching phase of the second switching unit based on the feedback signal.

3. A switching control apparatus for controlling a first switching unit and a second switching unit that contactlessly acquires electric power from the first switching unit, comprising:
   a contactless coupling element configured to contactlessly couple with a coupling element included in the second switching unit;
   a feedback signal acquisitor configured to acquire a feedback signal corresponding to the electric power transmitted from the first switching unit to the second switching unit, from the first switching unit, or from the second switching unit via the contactless coupling element;
   a command signal generator configured to generate a first switching command signal for the first switching unit and a second switching command signal for the second switching unit, based on the feedback signal; and a command signal transmitter configured to give the first switching command signal to the first switching unit and transmit the second switching command signal to the second switching unit via the contactless coupling element, wherein the first switching unit and the second switching unit perform switching at timings corresponding to the first switching command signal and the second switching command signal, respectively.

4. The switching control apparatus according to claim 3, wherein there is provided a phase adjuster including the command signal generator and the command signal transmitter and configured to adjust a difference between switching phase of the first switching unit and switching phase of the second switching unit based on the feedback signal.

5. A switching control apparatus for controlling a first switching unit and a second switching unit that contactlessly acquires electric power from the first switching unit, comprising:

a contactless coupling element configured to contactlessly couple with a coupling element included in the first switching unit;

a feedback signal acquisitor configured to acquire a feedback signal corresponding to the electric power transmitted from the first switching unit to the second switching unit, from the first switching unit via the contactless coupling element, or from the second switching unit;

a command signal generator configured to generate a first switching command signal for the first switching unit and a second switching command signal for the second switching unit, based on the feedback signal; and a command signal transmitter configured to transmit the first switching command signal to the first switching unit via the contactless coupling element and give the second switching command signal to the second switching unit, wherein the first switching unit and the second switching unit perform switching at timings corresponding to the first switching command signal and the second switching command signal, respectively.

6. The switching control apparatus according to claim 5, wherein there is provided a phase adjuster including the command signal generator and the command signal transmitter and configured to adjust a difference between switching phase of the first switching unit and switching phase of the second switching unit based on the feedback signal.

* * * * *